(12) United States Patent
Walke et al.

(10) Patent No.: US 9,307,394 B2
(45) Date of Patent: Apr. 5, 2016

(54) DEVICES AND METHODS FOR PREVENTING OUT-OF-SERVICE PERIODS IN MULTI-SUBSCRIPTION SCENARIOS

(71) Applicant: QUALCOMM Incorporated, San Diego, CA (US)

(72) Inventors: Simon James Walke, Basingstoke (GB); Neha Goel, Farnborough (GB); Chetan Gopalakrishnan Chakravarthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

(21) Appl. No.: 14/086,687

(22) Filed: Nov. 21, 2013

(65) Prior Publication Data
US 2015/0141006 A1 May 21, 2015

(51) Int. Cl.
*H04W 8/18* (2009.01)
*H04W 48/18* (2009.01)
*H04W 88/06* (2009.01)

(52) U.S. Cl.
CPC .............. *H04W 8/18* (2013.01); *H04W 48/18* (2013.01); *H04W 88/06* (2013.01)

(58) Field of Classification Search
CPC ................................ H04W 8/183; H04W 8/18
USPC ................... 455/556.1, 556.2, 557, 558, 434, 455/418–419, 435.2
See application file for complete search history.

(56) References Cited

U.S. PATENT DOCUMENTS

| | | |
|---|---|---|
| 2012/0088502 A1 | 4/2012 | Chin et al. |
| 2012/0322504 A1* | 12/2012 | Chou et al. ............. 455/558 |
| 2013/0012135 A1* | 1/2013 | Ruohonen et al. ........... 455/63.1 |
| 2013/0072236 A1* | 3/2013 | Fang et al. .................... 455/458 |
| 2013/0090137 A1 | 4/2013 | Krishnamoorthy et al. |
| 2013/0157662 A1 | 6/2013 | Han et al. |
| 2013/0203461 A1 | 8/2013 | Li |
| 2013/0210484 A1 | 8/2013 | Jeenagala et al. |
| 2013/0260761 A1 | 10/2013 | Walke et al. |
| 2015/0050952 A1* | 2/2015 | Ponukumati .................. 455/458 |
| 2015/0237497 A1* | 8/2015 | Chen .................... H04W 8/183 455/558 |

(Continued)

FOREIGN PATENT DOCUMENTS

EP 2605558 A1 6/2013

OTHER PUBLICATIONS

3GPP TS 25.304: "3rd Generation Partnership Project; Technical Specification Group Radio Access Network; User Equipment (UE) procedures in idle mode and procedures for cell reselection in connected mode", Version 11.4.0, Release 11, Sep. 2013, pp. 1-53.

(Continued)

*Primary Examiner* — Cong Tran
(74) *Attorney, Agent, or Firm* — Loza & Loza, LLP

(57) ABSTRACT

Access terminals capable of employing multiple subscriptions are adapted to prevent out-of-service periods for one or more subscriptions. According to one example, an access terminal can establish a data communication on a first subscription utilizing a first network, and an idle mode connection on a second subscription utilizing a second network. A determination can be made that the first subscription is indicating data transfer. In response to such a determination, the second subscription can attempt a change from a radio access technology associated with the second network to a different radio access technology. Other aspects, embodiments, and features are also included.

23 Claims, 9 Drawing Sheets

(56) References Cited

U.S. PATENT DOCUMENTS

2015/0334641 A1* 11/2015 Kotreka ............... H04W 48/18
 455/558
2015/0382179 A1* 12/2015 Howard et al. ....... H04W 8/183
 455/418

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 11)", 3GPP Standard; 3GPP TS 36.304, 3rd Generation Partnership Project (3GPP), Mobile Competence Centre; 650. Route Des Lucioles; F-06921 Sophia-Antipolis Cedex; France, vol. RAN WG2. No. V11.5.0, Sep. 17, 2013, pp. 1-34, XP050712297, [retrieved on Sep. 17, 2013].

International Search Report and Written Opinion—PCT/US2014/065833—ISA/EPO—Apr. 13, 2015.

* cited by examiner

DEVICES AND METHODS FOR PREVENTING OUT-OF-SERVICE PERIODS IN MULTI-SUBSCRIPTION SCENARIOS

TECHNICAL FIELD

The technology discussed below relates generally to wireless communications, and more specifically to methods and devices for preventing out-of-service periods in multi-subscription devices.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

In some instances, access terminals can be adapted to support a plurality of subscriptions (e.g., via a plurality of subscriber identity modules (SIMs)). An access terminal with multiple subscription capabilities (e.g., multiple SIMs) may be able to use multiple services without the need to carry multiple access terminals at the same time. Each subscription (e.g., SIM) may be associated with a different subscriber account, a different network, and/or a different radio access technology (RAT). In such examples, the same access terminal can be used for business and private use with separate numbers and separate bills, or for travel when an additional SIM is employed for a visited country. Some multiple subscription configurations enable each subscription to be active simultaneously, allowing calls to be received on either number at any given time (e.g., Dual SIM Dual Standby (DSDS), Dual SIM Dual Active (DSDA), Triple SIM Triple Standby (TSTS)).

Various features are desirable to optimize the performance of access terminals employing multiple subscriptions.

Brief Summary of Some Examples

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various examples and implementations of the present disclosure facilitate out-of-service avoidance in access terminals capable of employing multiple subscriptions. According to at least one aspect of the disclosure, access terminals may include a communications interface and a plurality of subscription modules, each coupled with a processing circuit. The processing circuit may be adapted to establish a data communication session through the communications interface utilizing a first network on a first subscription associated with a first subscription module. An idle mode connection may also be established through the communications interface utilizing a second network on a second subscription associated with a second subscription module. The processing circuit may further be adapted to cause the second subscription to attempt a change from a radio access technology associated with the second network to a different radio access technology in response to a determination that the first subscription is indicating data transfer.

Further aspects provide methods operational on access terminals and/or access terminals including means to perform such methods. One or more examples of such methods may include establishing a data communication session on a first subscription utilizing a first network, and an idle mode connection on a second subscription utilizing a second network. The second subscription may attempt to change from a radio access technology associated with the second network to a different radio access technology in response to a determination that the first subscription is indicating data transfer.

Still further aspects include processor-readable storage mediums comprising programming operational on a computer, such as an access terminal According to one or more examples, such programming may be adapted for causing a processing circuit to establish a data communication session on a first subscription utilizing a first network, and an idle mode connection on a second subscription utilizing a second network. The programming may further be adapted to cause a processing circuit to determine whether the first subscription is indicating data transfer, and attempt to change the second subscription from a radio access technology associated with the second network to a different radio access technology when it is determined that the first subscription is indicating data transfer.

Other aspects, features, and embodiments associated with the present disclosure will become apparent to those of ordinary skill in the art upon reviewing the following description in conjunction with the accompanying figures.

DRAWINGS

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of telecommunication systems, network architectures, and communication standards. Certain aspects of the disclosure are described below with reference to specific protocols, systems, and technologies. However, those of ordinary skill in the art will recognize that one or more aspects of the present disclosure may be employed and included in one or more other wireless communication protocols, systems, and technologies.

Figure 1:
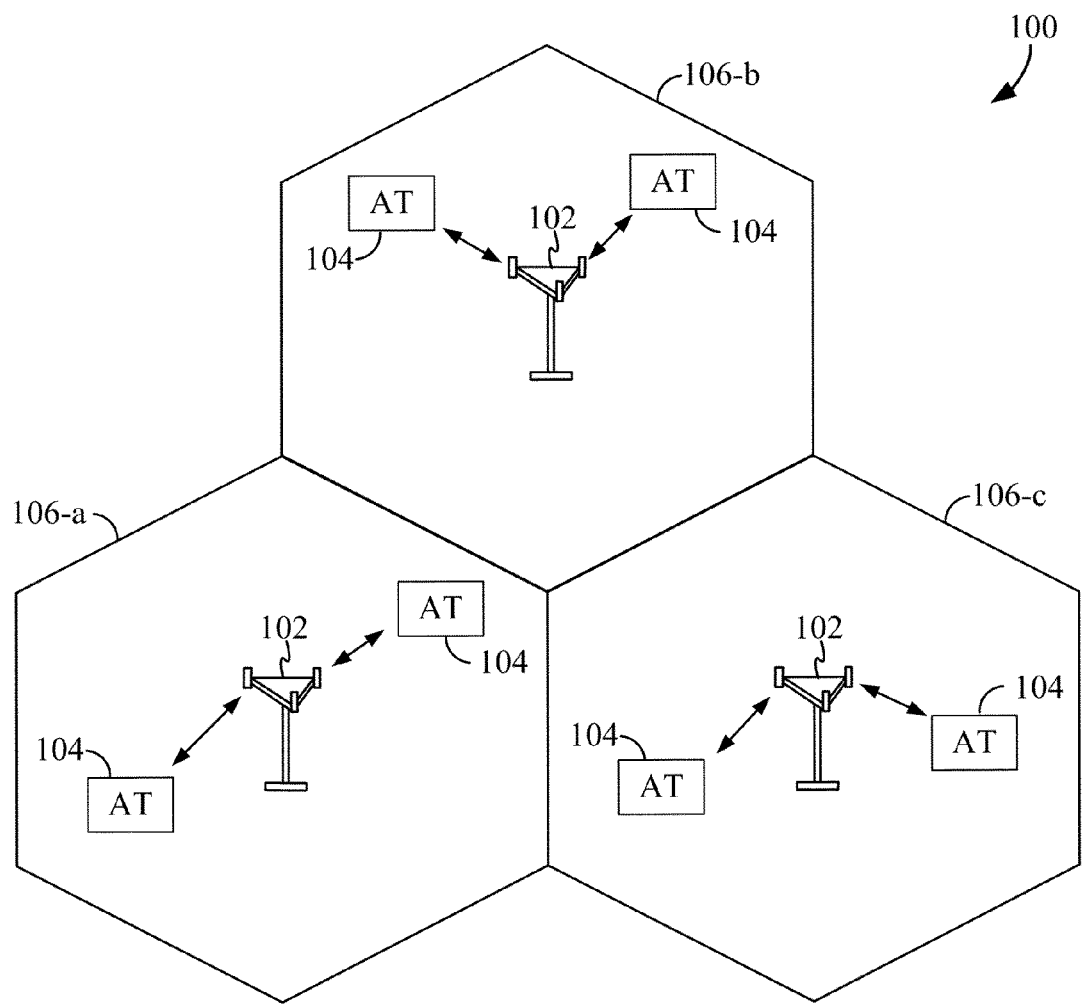
FIG. 1 is a block diagram of a network environment in which one or more aspects of the present disclosure may find application.

Referring now to FIG. 1, a block diagram of a network environment in which one or more aspects of the present disclosure may find application is illustrated. The wireless communications system 100 is adapted to facilitate wireless communication between one or more base stations 102 and access terminals 104. The base stations 102 and access terminals 104 may be adapted to interact with one another through wireless signals. In some instances, such wireless interaction may occur on multiple carriers (waveform signals of different frequencies). Each modulated signal may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. Such a base station 102 may also be referred to by those skilled in the art as a base transceiver station (BTS), a radio base station, a radio transceiver, a transceiver function, a basic service set (BSS), and extended service set (ESS), a node B, a femto cell, a pico cell, or some other suitable terminology.

Figure 2:
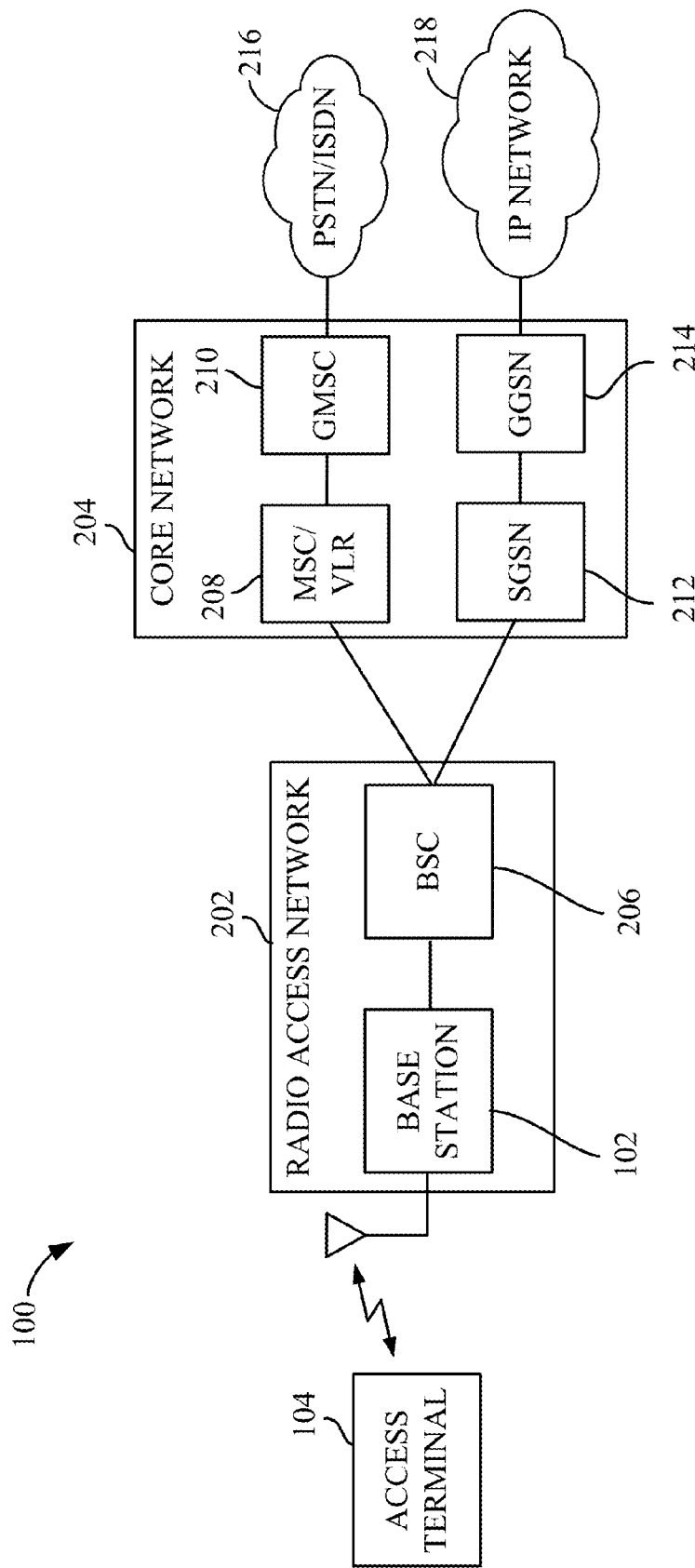
FIG. 2 is a block diagram illustrating select components of the wireless communication system of FIG. 1 according to at least one example.

The base stations 102 are configured to communicate with the access terminals 104 under the control of a base station controller (see FIG. 2). Each of the base station 102 sites can provide communication coverage for a respective geographic area. The coverage area 106 for each base station 102 here is identified as cells 106-a, 106-b, or 106-c. The coverage area 106 for a base station 102 may be divided into sectors (not shown, but making up only a portion of the coverage area). In various examples, the system 100 may include base stations 102 of different types.

One or more access terminals 104 may be dispersed throughout the coverage areas 106. Each access terminal 104 may communicate with one or more base stations 102. An access terminal 104 may generally include one or more devices that communicate with one or more other devices through wireless signals. Such an access terminal 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. An access terminal 104 may include a mobile terminal and/or an at least substantially fixed terminal Examples of an access terminal 104 include a mobile phone, a pager, a wireless modem, a personal digital assistant, a personal information manager (PIM), a personal media player, a palmtop computer, a laptop computer, a tablet computer, a television, an appliance, an e-reader, a digital video recorder (DVR), a machine-to-machine (M2M) device, meter, entertainment device, router, and/or other communication/computing device which communicates, at least partially, through a wireless or cellular network.

Turning to FIG. 2, a block diagram illustrating select components of the wireless communication system 100 is depicted according to at least one example. As illustrated, the base stations 102 are included as at least a part of a radio access network (RAN) 202. The radio access network (RAN) 202 is generally adapted to manage traffic and signaling between one or more access terminals 104 and one or more other network entities, such as network entities included in a core network 204. The radio access network 202 may, according to various implementations, be referred to by those skill in the art as a base station subsystem (BSS), an access network, a GSM Edge Radio Access Network (GERAN), a UMTS Terrestrial Radio Access Network (UTRAN), etc.

In addition to one or more base stations 102, the radio access network 202 can include a base station controller (BSC) 206, which may also be referred to by those of skill in the art as a radio network controller (RNC). The base station controller 206 is generally responsible for the establishment, release, and maintenance of wireless connections within one or more coverage areas associated with the one or more base stations 102 which are connected to the base station controller 206. The base station controller 206 can be communicatively coupled to one or more nodes or entities of the core network 204.

The core network 204 is a portion of the wireless communications system 100 that provides various services to access terminals 104 that are connected via the radio access network 202. The core network 204 may include a circuit-switched (CS) domain and a packet-switched (PS) domain. Some examples of circuit-switched entities include a mobile switching center (MSC) and visitor location register (VLR), identified as MSC/VLR 208, as well as a Gateway MSC (GMSC) 210. Some examples of packet-switched elements include a Serving GPRS Support Node (SGSN) 212 and a Gateway GPRS Support Node (GGSN) 214. Other network entities may be included, such as an EIR, a HLR, a VLR and/or a AuC, some or all of which may be shared by both the circuit-switched and packet-switched domains. An access terminal 104 can obtain access to a public switched telephone network (PSTN) 216 via the circuit-switched domain, and to an IP network 218 via the packet-switched domain.

Figure 3:
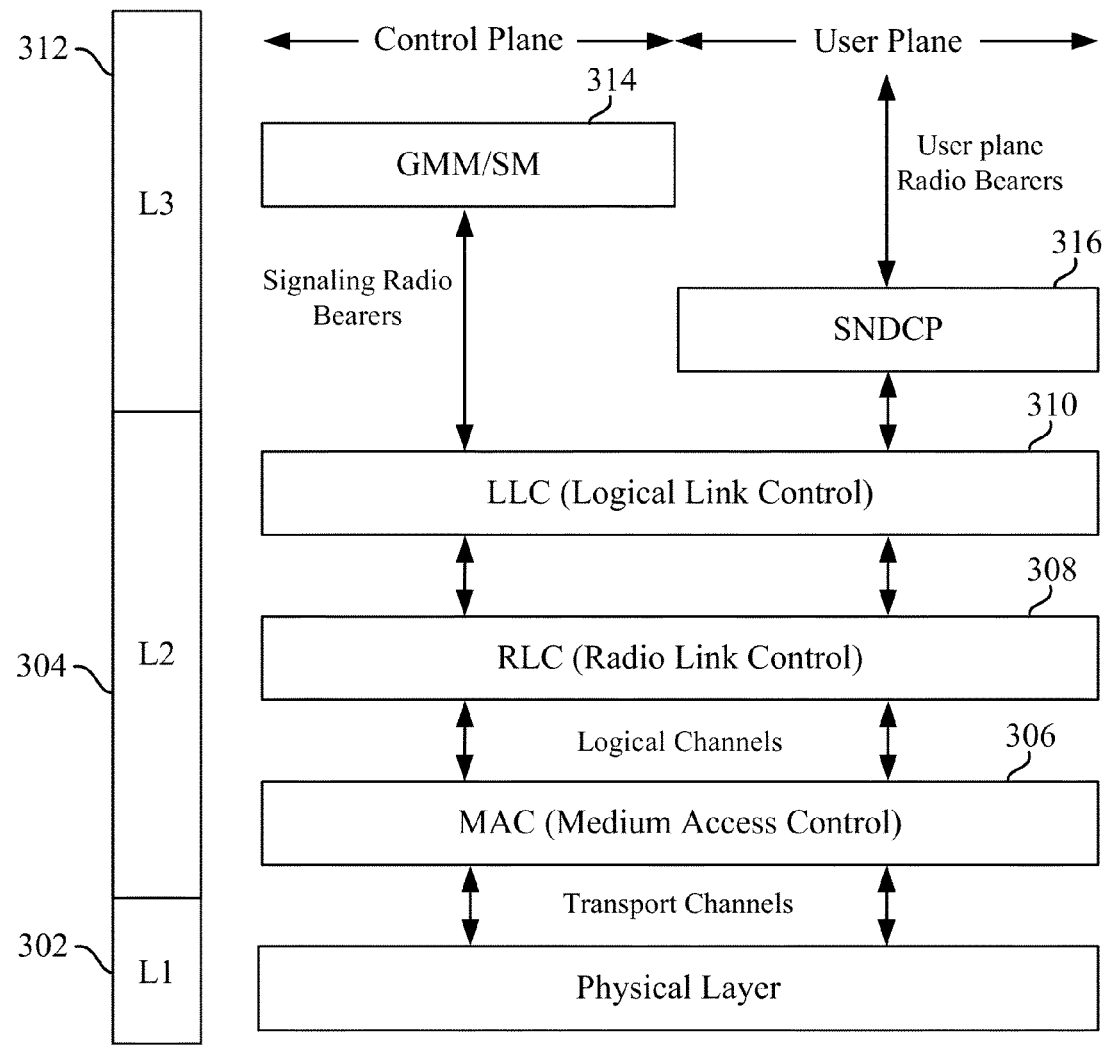
FIG. 3 is a block diagram illustrating an example of a protocol stack architecture which may be implemented by an access terminal.

The access terminals 104 may be adapted to employ a protocol stack architecture for communicating data between the access terminal 104 and one or more network entities of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 3 is a block diagram illustrating an example of a protocol stack architecture which may be implemented by an access terminal 104. In the example of a signaling protocol stack in FIG. 3, the protocol stack is divided into a Non-Access Stratum (NAS) and an Access Stratum (AS). The NAS provides the upper layers, for signaling between the access terminal 104 and the core network 204 (referring to FIG. 2), and may include circuit switched and packet switched protocols. The AS provides the lower layers, for signaling between the RAN 202 and the access terminal 104, and may include a user plane and a control plane. Here, the user plane (or data plane) carries user traffic (e.g., voice services, data services), while the control plane carries control information (e.g., signaling).

The protocol stack architecture for the access terminal 104 is shown to generally include three layers: Layer 1 (L1), Layer 2 (L2), and Layer 3 (L3). Layer 1 302 is the lowest layer and implements various physical layer signal processing functions. Layer 1 302 is also referred to herein as the physical layer 302. This physical layer 302 provides for the transmission and reception of radio signals between the access terminal 104 and a base station 102.

The data link layer, called layer 2 (or "the L2 layer") 304 is above the physical layer 302 and is responsible for delivery of signaling messages generated by Layer 3. The L2 layer 304 makes use of the services provided by the physical layer 302. The L2 layer 304 may include various sublayers, including a Medium Access Control (MAC) sublayer 306, a Radio Link Control (RLC) sublayer 308, and a Logical Link Control (LLC) sublayer 310.

The MAC sublayer 306 is the lower sublayer of the L2 layer 304. The MAC sublayer 306 implements the medium access protocol and is responsible for transport of higher layers' protocol data units using the services provided by the physical layer 302. The MAC sublayer 306 may manage the access of data from the higher layers to the shared air interface by providing multiplexing between logical and transport channels.

The RLC sublayer 308 provides segmentation and reassembly of upper layer data packets, retransmission of lost data packets, and reordering of data packets to compensate for out-of-order reception. The RLC sublayer 308 makes use of the services provided by the lower layers (e.g., layer 1 and the MAC sublayer).

The LLC sublayer 310 provides flow and sequence control, as well as error control. For example, the LLC sublayer 310 may be responsible for the framing of the user data packets and signaling messages of the mobility management and session management subsystem of the SGSN (e.g., SGSN 212 in FIG. 2). The LLC sublayer 310 may also ensure a reliable connection between the access terminal 300 and the SGSN (e.g., SGSN 212 in FIG. 2) by using an acknowledgement mechanism for correctly received blocks.

Layer 3 312, which may also be referred to as the upper layer or the L3 layer, makes use of the services provided by the L2 layer. The L3 layer 312 includes a GPRS Mobility Management and Session Management (GMM/SM) layer 314 in the control plane and a Subnetwork Dependent Convergence Protocol (SNDCP) layer 316 in the user plane. The GMM/SM layer 314 is where signaling messages originate and terminate according to the semantics and timing of the communication protocol between a base station 102 and the access terminal 104. The SNDCP layer 316 provides multiplexing between different radio bearers and logical channels. The SNDCP layer 316 can also provide header compression for upper layer data packets to reduce radio transmission overhead, security by ciphering the data packets, and handover support for the access terminal 300 between base stations (e.g., base stations 102 in FIG. 1).

Although FIG. 3 illustrates various layers and sublayers of the protocol stack, it should be understood that an access terminal 104 may employ additional, fewer, or different layers and/or sublayers according to various implementations.

In some instances, one or more of the access terminals 104 operating within the wireless communications system 100 may be adapted to support a plurality of subscriptions (e.g., via a plurality of subscriber identity modules (SIMs)), such as Dual SIM Dual Standby (DSDS), Dual SIM Dual Active (DSDA), Triple SIM Triple Standby (TSTS), etc. Each subscription may be associated with a different subscriber account, a different network, and/or a different radio access technology (RAT). One example of a multi-subscription implementation on an access terminal 104 may employ one radio access technology (RAT) for voice communication and another radio access technology (RAT) for data. In some configurations, the multiple subscriptions employed by the access terminal 104 may share a radio chain so that only one subscription can actively transmit and/or receive communications at a given moment in time. As a result, communication utilizing a radio access technology (RAT) for the first subscription typically suspends momentarily so that the transceiver can tune away to a radio access technology (RAT) for the second subscription to perform communication activity for the second subscription before tuning back to the first radio access technology (RAT) for the first subscription. However, some access terminals 104 do not support such tune-away features.

In a single-transceiver multi-SIM device that lacks tune-away support, it may occur that one subscription is relatively busy and taking up the transceiver resources, while the other subscription experiences relatively long periods of out-of-service due to denial of the transceiver resources. That is, as a result of the two subscriptions competing for use of the single transceiver, it can occur that one subscription goes out of service for a period of time because the other subscription takes up all the transceiver resources.

Figure 4:
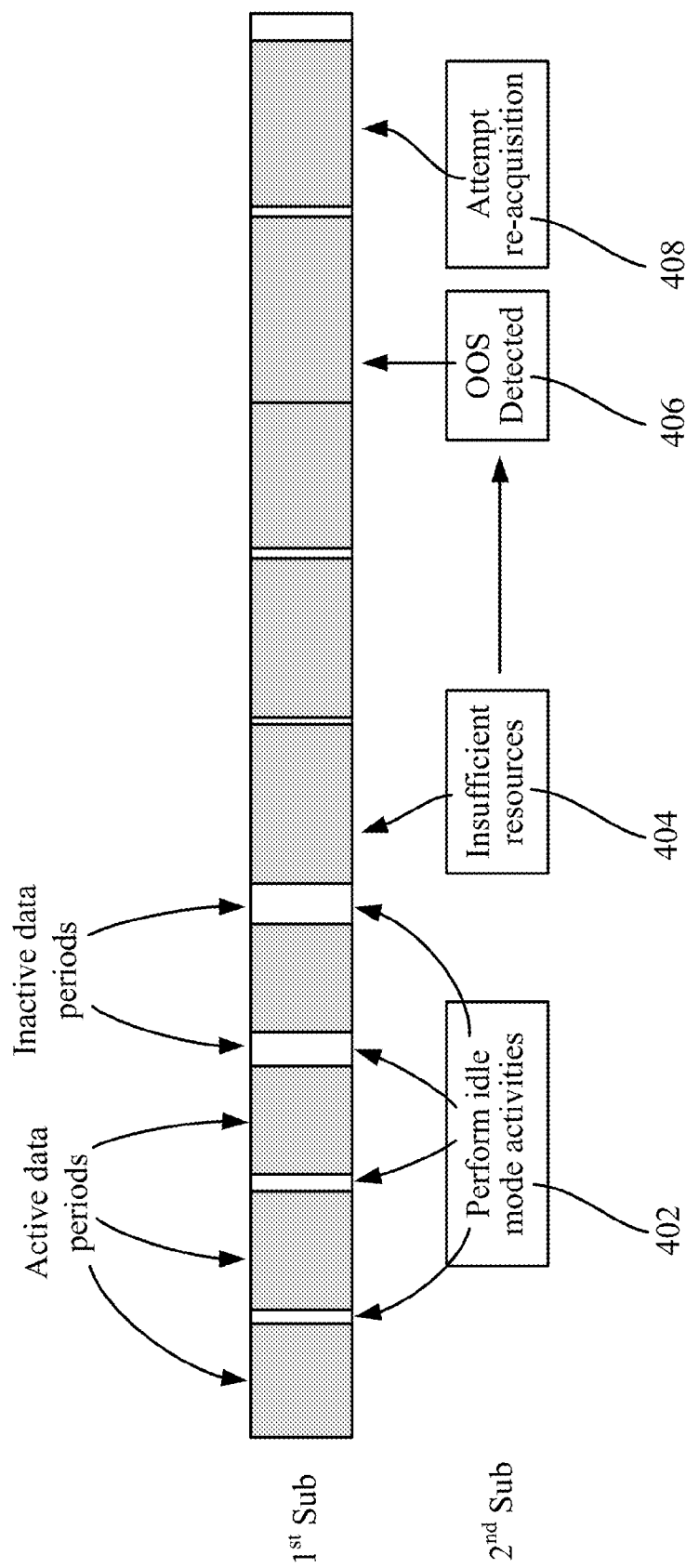
FIG. 4 is a block diagram of a timeline showing usage of radio chain resources for an example scenario in which a first subscription may cause a second subscription to experience relatively long periods of out-of-service.

Turning to FIG. 4, a block diagram of a timeline of usage of radio chain resources is shown illustrating an example of a scenario in which a first subscription may cause a second subscription to experience relatively long periods of out-of-service. In this example, an access terminal 104 may include a first subscription associated with a first radio access technology (RAT) (e.g., a GSM network) for data communication and a second subscription associated with a second radio access technology (RAT) (e.g., a W-CDMA network).

In some instances, the data traffic on the first subscription may be "bursty," meaning that periods of data activity may be intermittent, with periods of data inactivity in between. In the block diagram the shaded blocks illustrate active data periods on the first subscription, which is experiencing bursty data traffic, and the white portions illustrate inactive periods on the first subscription. Further, it is assumed that the second subscription is camped on a cell for its associated radio access technology (RAT) (e.g., camped on a W-CDMA cell). During the brief periods of inactivity for the first subscription, the second subscription can attempt to utilize the transceiver resources to perform idle mode activities on its associated network as shown at 402. For example, the second subscription may employ the transceiver resources to attempt to re-acquire the cell and receive any incoming page messages.

As seen towards the middle of the timeline, however, there may be periods where the data activity on the first subscription does not halt for sufficiently long enough periods of time to enable the second subscription to use the transceiver resources, as depicted by the period of insufficient resources 404. As a result of such relatively long periods and the lack of a tune-away capability, the second subscription can experience relatively long periods of being out-of-service 406, leading to the second subscription staying in a certain cell selection state for relatively long periods of time. That is, when the second subscription goes for extended periods of time without access to the transceiver resources (because they are occupied by the first subscription data session), the NAS (the upper layer entity at the access terminal 104) may eventually declare an out-of-service (OOS) condition at 406.

Once the NAS determines that the OOS condition exists, the second subscription (i.e., the idle subscription) may attempt to re-acquire service at 408 on the last registered RAT, i.e., the W-CDMA cell. However, due to the lack of tune-away capabilities at the access terminal 104, and the fact that the first subscription data session is occupying all of the transceiver resources, any re-acquisition attempts would fail. This re-acquisition attempt and failure continues to occur until the NAS entity at the access terminal 104 informs a lower layer at the access terminal 104 (e.g., the GMM/SM layer 314 in FIG. 3) to stop its re-acquisition attempts on the radio access technology (RAT) (e.g., the W-CDMA cell) associated with the second subscription, and start searching on a new radio access technology (e.g., the GSM network).

Figure 5:
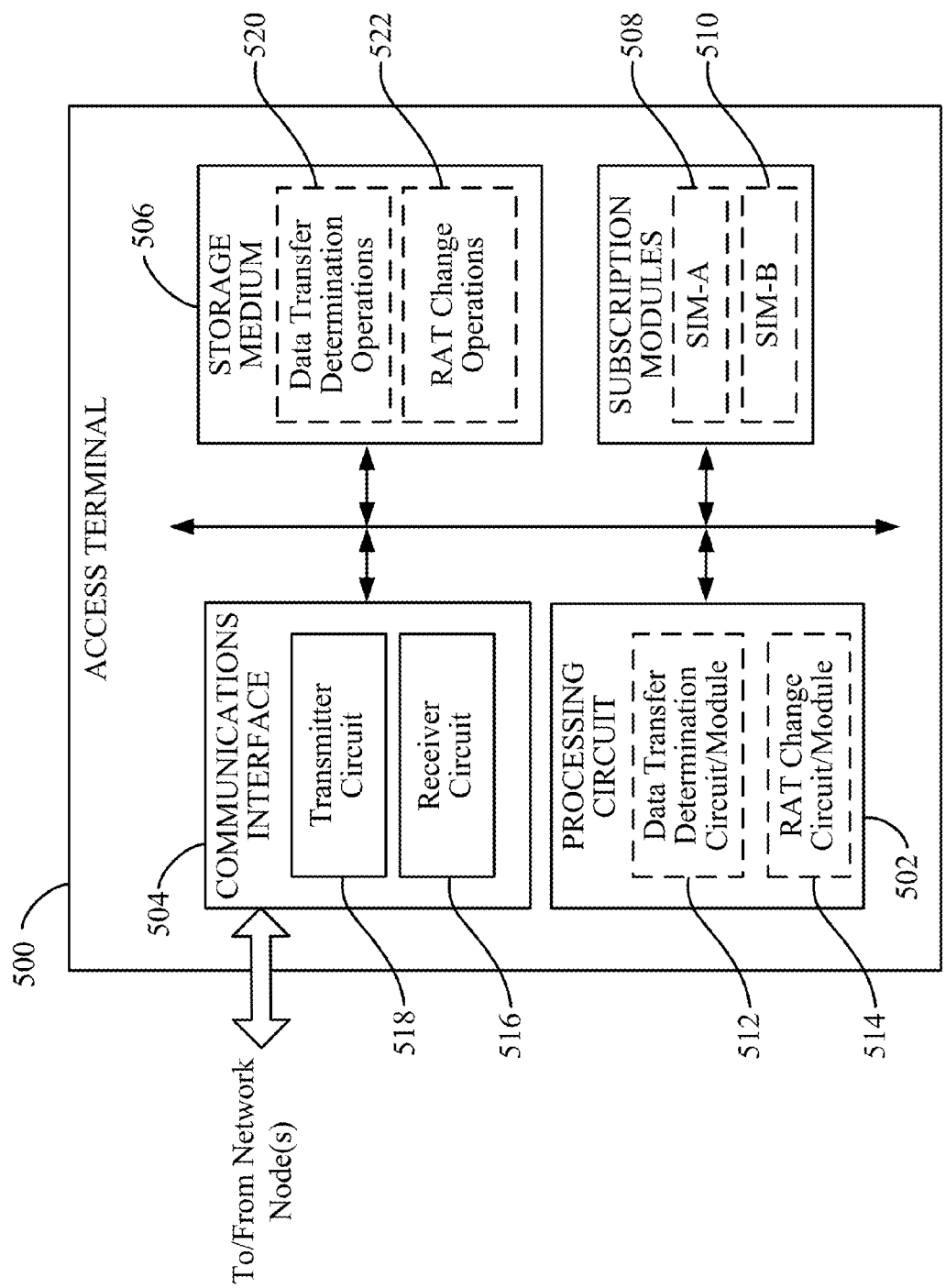
FIG. 5 is a block diagram illustrating select components of an access terminal according to at least one example.

According to at least one aspect of the disclosure, multi-subscription access terminals that do not support tune-away operations are adapted to facilitate out-of-service avoidance for one subscription when the other subscription is using the transmitter/receiver resources. FIG. 5 is a block diagram illustrating select components of an access terminal 500 according to at least one example of the present disclosure. The access terminal 500 includes a processing circuit 502 coupled to or placed in electrical communication with a communications interface 504 and a storage medium 506.

According to an aspect of the present disclosure, the access terminal 500 is adapted to employ multiple subscriptions. Accordingly, the access terminal 500 further includes two or more subscription modules represented generally by SIM-A 508 and SIM-B 510. The subscription modules 508, 510 may also be referred to interchangeably herein as a subscriber identity module (SIM). However, the one or more subscription modules may be one or more suitable subscription modules including, but not limited to, a Subscriber Identity Module (SIM), Removable User Identity Module (R-UIM), Universal Integrated Circuit Card (UICC), CDMA Subscriber Identity Module (CSIM), Universal Subscriber Identity Module (USIM)), etc. SIM-A 508 and SIM-B 510 may be associated with a different service subscription, different network access over the same or different network type, and/or use the same or different radio access technologies.

The processing circuit 502 is arranged to obtain, process and/or send data, control data access and storage, issue commands, and control other desired operations. The processing circuit 502 may include circuitry adapted to implement desired programming provided by appropriate media in at least one example. For example, the processing circuit 502 may be implemented as one or more processors, one or more controllers, and/or other structure configured to execute executable programming Examples of the processing circuit 502 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 502 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 502 are for illustration and other suitable configurations within the scope of the present disclosure are also contemplated.

The processing circuit 502 is adapted for processing, including the execution of programming, which may be stored on the storage medium 506. As used herein, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 502 may include data transfer determination circuit and/or module 512, as well as a radio access technology (RAT) change circuit and/or module 514. The data transfer determination circuit/module 512 may include circuitry and/or programming (e.g., programming stored on the storage medium 506) adapted to identify when a first subscription is indicating data transfer for a prolonged period of time such that a second subscription in idle mode is unable to perform idle mode operations. The RAT change circuit/module 514 may include circuitry and/or programming (e.g., programming stored on the storage medium 506) adapted to cause the second subscription to attempt to change to a different radio access technology (RAT).

The communications interface 504 is configured to facilitate wireless communications of the access terminal 500. For example, the communications interface 504 may include circuitry and/or programming adapted to facilitate the communication of information bi-directionally with respect to one or more wireless network devices (e.g., network nodes). The communications interface 504 may be coupled to one or more antennas (not shown), and includes wireless transceiver circuitry, including at least one receiver circuit 516 (e.g., one or more receiver chains) and/or at least one transmitter circuit 518 (e.g., one or more transmitter chains). In various implementations, the transceiver circuitry can be configured facilitate wireless communications for only a single subscription module (e.g., SIM-A 508 and SIM-B 510) at a given moment in time. That is, at any given moment in time, only one subscription module, SIM-A 508 or SIM-B 510, may transmit/receive communications via the communications interface 504.

The storage medium 506 may represent one or more processor-readable devices for storing programming, such as processor executable code or instructions (e.g., software, firmware), electronic data, databases, or other digital information. The storage medium 506 may also be used for storing data that is manipulated by the processing circuit 502 when executing programming. The storage medium 506 may be any available media that can be accessed by a general purpose or special purpose processor, including portable or fixed storage devices, optical storage devices, and various other mediums capable of storing, containing and/or carrying programming By way of example and not limitation, the storage medium 506 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 506 may be coupled to the processing circuit 502 such that the processing circuit 502 can read information from, and write information to, the storage medium 506. That is, the storage medium 506 can be coupled to the processing circuit 502 so that the storage medium 506 is at least accessible by the processing circuit 502, including examples where the storage medium 506 is integral to the processing circuit 502 and/or examples where the storage medium 506 is separate from the processing circuit 502 (e.g., resident in the access terminal 500, external to the access terminal 500, distributed across multiple entities).

Programming stored by the storage medium 506, when executed by the processing circuit 502, causes the processing circuit 502 to perform one or more of the various functions and/or process steps described herein. For example, the storage medium 506 may include data transfer determination operations 520, and radio access technology (RAT) change operations 522. The data transfer determination operations 520 are adapted to cause the processing circuit 502 (e.g., the data transfer determination circuit/module 512) to determine that one of the subscriptions is indicating data transfer, as described herein. The RAT change operations 522 are adapted to cause the processing circuit 502 (e.g., the data transfer determination circuit/module 512) to cause another subscription camped in idle mode to attempt to change to a different radio access technology (RAT) in response to the determination that the first subscription is indicating data transfer.

Thus, according to one or more aspects of the present disclosure, the processing circuit 502 is adapted to perform (in conjunction with the storage medium 506) any or all of the processes, functions, steps and/or routines for any or all of the access terminals described herein (e.g., access terminal 104, access terminal 500). As used herein, the term "adapted" in relation to the processing circuit 502 may refer to the processing circuit 502 being one or more of configured, employed, implemented, and/or programmed (in conjunction with the storage medium 506) to perform a particular process, function, step and/or routine according to various features described herein.

Figure 6:
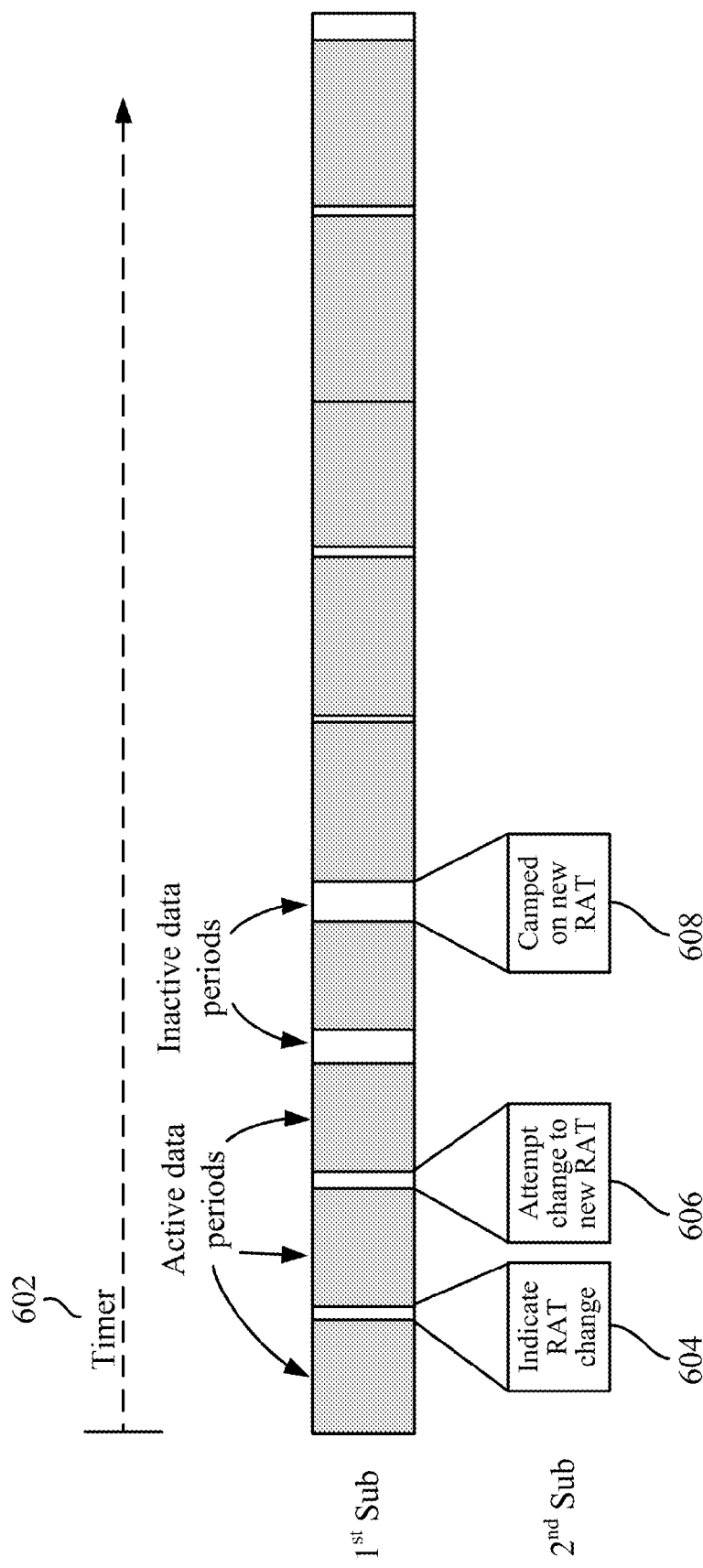
FIG. 6 is a block diagram of a timeline of usage of radio chain resources according to one implementation of the present disclosure.

Employing aspects of the present disclosure, when the same scenario described above with reference to FIG. 4 occurs, the access terminal 500 can avoid one or more of the problems encountered by a conventional device. For example, FIG. 6 is a block diagram of a timeline of usage of radio chain resources. In this example, the first subscription associated with the SIM-A 508 has established a data communication session utilizing a first radio access technology (RAT) (e.g., a GSM network). The second subscription with the SIM-B 510 has established an idle mode connection, and is camped on a cell associated with a second radio access technology (RAT) (e.g., a W-CDMA or LTE network).

Like the example in FIG. 4, the shaded blocks illustrate active data periods on the first subscription, which is experiencing bursty data traffic, and the white portions illustrate inactive periods on the first subscription. Under this circumstance, the first subscription is in a state which indicates data transfer. For example, the first subscription may remain in a state adapted to indicate that data transfer is either occurring or will shortly occur. In a GSM network, an example of such a state is the GPRS Mobility Management (GMM) ready state. In other words, a GMM layer at the access terminal 500 transitions between certain GMM states, including idle, standby, and ready. When the first subscription is active in data transfer, or soon to be active in data transfer, the GMM layer is set to the GMM ready state. While in the GMM ready state, and after transmission of the last packet (or protocol data unit, PDU), a GMM ready timer is run, as indicated by timer 602. The GMM ready timer is known as the T3314 timer in the standards, and is reset after transmission of the last packet in each burst of the bursty transmissions. If this timer expires, the first subscription transitions the GMM layer from the GMM ready state to the GMM standby state.

When it is determined that the first subscription is indicating data transfer (e.g., that the first subscription is in the GMM ready state), the second subscription can indicate a radio access technology (RAT) change at 604. At 606, the second subscription can employ the communications interface 504 to attempt a change to the new radio access technology. Finally, at 608, the second subscription can camp on the new radio access technology.

By way of a more specific example, the first subscription can establish a data communication session on a GSM network, while the second subscription can establish an idle mode connection on a W-CDMA network. The first subscription enters into a GMM ready state, and the access terminal 500 accordingly determines that the first subscription is indicating data transfer. The presence of the GMM ready state on the first subscription generally indicates that the risk of the idle mode connection for the second subscription on the W-CDMA cell going out of service may be high.

In response to the first subscription being in the GMM ready state, the access terminal 500 indicates to the second subscription to attempt a change from the W-CDMA network to the GSM network at 604. For example, the access terminal 500 can cause the second subscription to initiate a search on the GSM network and/or to reselect to a neighbor cell on the GSM network. At 608, the second subscription attempts the change from the W-CDMA network to the GSM network by, for example, initiating a service search on the GSM network and/or reselecting to a neighbor cell on the GSM network. After successfully changing to the GSM network, the second subscription camps on the cell of the GSM network.

Figure 7:
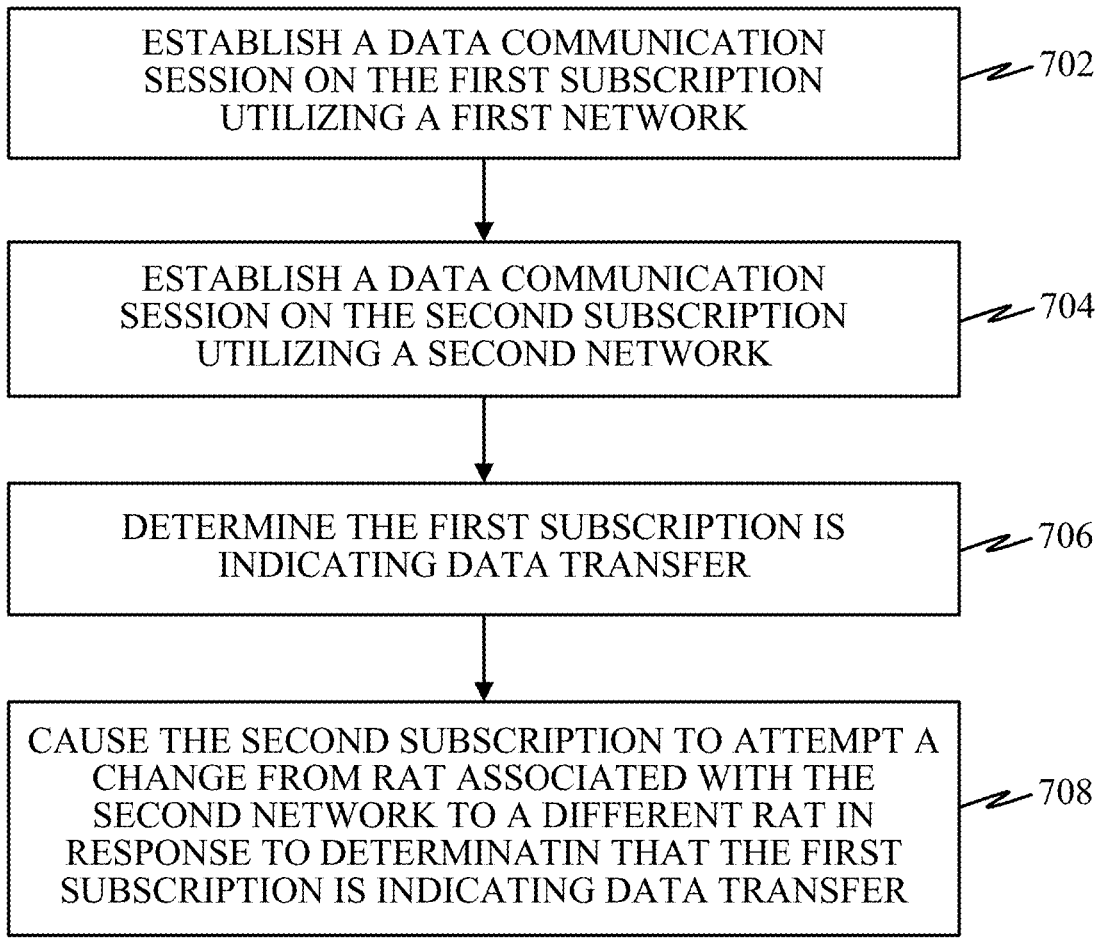
FIG. 7 is a flow diagram illustrating a method operational on an access terminal according to at least one example.

FIG. 7 is a flow diagram illustrating at least one example of a method operational on an access terminal, such as the access terminal 500. Referring to FIGS. 5 and 7, an access terminal 500 can establish a data communication session on a first subscription utilizing a first network at 702. For example, the processing circuit 502 can establish a data communication session via the communications interface 504 using a first network (e.g., a GSM network) on a first subscription associated with SIM-A 508.

At 704, the access terminal 500 can establish an idle mode connection on the second subscription utilizing a second network. For example, the processing circuit 502 can establish an idle mode connection via the communications interface 504 using a second network (e.g., a W-CDMA or LTE network) on a second subscription associated with SIM-B 510.

At 706, the access terminal 500 can determine that the first subscription is indicating data transfer. For example, the processing circuit 502 (e.g., the data transfer determination circuit/module 512) executing the data transfer determination operations 520 can determine whether the first subscription associated with SIM-A 508 is indicating data transfer. As used herein, the indication of data transfer by a subscription refers to the subscription indicating that it is in data transfer or is soon to be in data transfer. For example, when the first subscription employs a GSM radio access technology (RAT), the indication of data transfer can occur when the first subscription is in the GMM ready state described above. This GMM ready state is a GSM state that can indicate that the subscription is either in data transfer or is about to be in data transfer.

Figure 8:
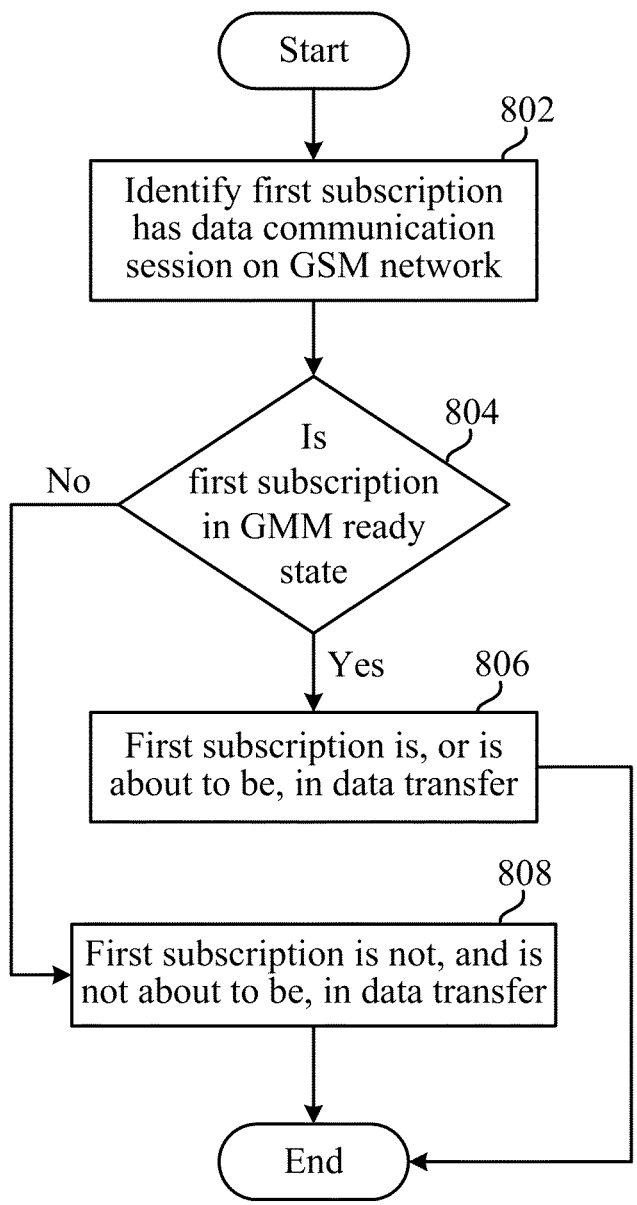
FIG. 8 is a flow diagram of a process for determining that the first subscription is indicating data transfer, according to one example for a GSM radio access technology.

FIG. 8 is a flow diagram of a process for determining that the first subscription is indicating data transfer, according to one example for a GSM radio access technology. At operation 802, the processing circuit 502 (e.g., the data transfer determination circuit/module 512) executing the data transfer determination operations 520 can identify that the first subscription associated with SIM-A 508 has a data communication session on a GSM network. At decision diamond 804, the processing circuit 502 (e.g., the data transfer determination circuit/module 512) executing the data transfer determination operations 520 can determine whether the first subscription associated with SIM-A 508 is in the GMM ready state. That is, the processing circuit 502 (e.g., the data transfer determination circuit/module 512) executing the data transfer determination operations 520 can determine whether the GMM layer 314 associated with SIM-A 508 is in a ready state.

If the first subscription is determined to be in the GMM ready state, then the processing circuit 502 (e.g., the data transfer determination circuit/module 512) executing the data transfer determination operations 520 can determine at operation 806 that the first subscription is, or is about to be, in data transfer. If the first subscription is determined not to be in the GMM ready state, then the processing circuit 502 (e.g., the data transfer determination circuit/module 512) executing the data transfer determination operations 520 can determine at operation 808 that the first subscription is not, and is not about to be, in data transfer.

Referring again to FIGS. 5 and 7, the access terminal 500 can cause the second subscription to attempt a change from a radio access technology (RAT) associated with the second network to a different radio access technology (RAT) in response to the determination that the first subscription is indicating data transfer. For example, the processing circuit 502 (e.g., the RAT change circuit/module 514) executing the RAT change operations 522 can cause the second subscription associated with SIM-B 510 to attempt a change from its current radio access technology (RAT) to a new radio access technology (RAT) in response to the first subscription indicating data transfer.

Figure 9:
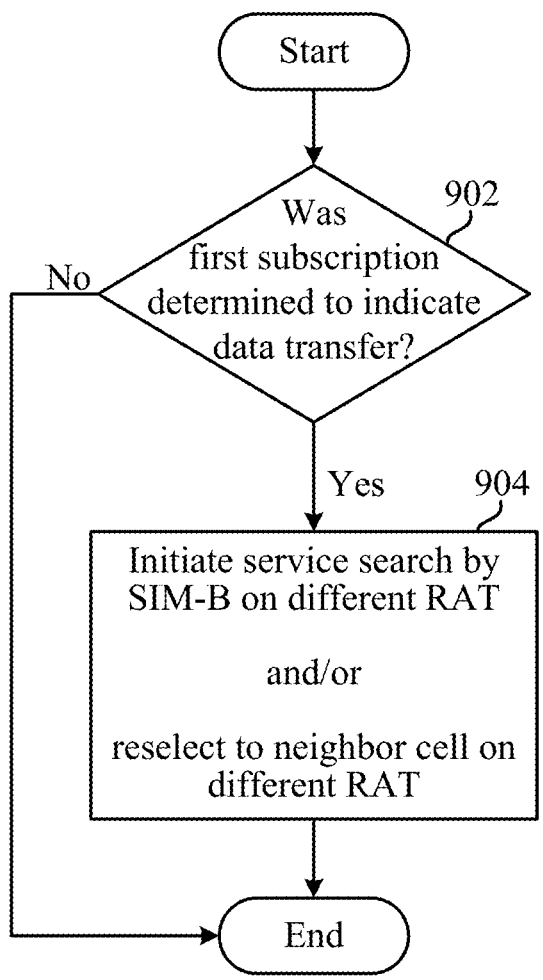
FIG. 9 is a flow diagram of a process for causing the second subscription to attempt to change to a new radio access technology (RAT), according to one example.

FIG. 9 is a flow diagram of a process for causing the second subscription to attempt to change to a new radio access technology (RAT), according to one example. At decision diamond 902, the processing circuit 502 (e.g., the RAT change circuit/module 514) executing the RAT change operations 522 can decide if the first subscription associated with SIM-A 508 was determined to be indicating data transfer. If the first subscription is not indicating data transfer, then the process can end. If, on the other hand, the first subscription is indicating data transfer (e.g., the GMM layer corresponding to the first subscription is in a GMM ready state), then the processing circuit 502 (e.g., the RAT change circuit/module 514) executing the RAT change operations 522 can cause the second subscription to attempt a change to a new radio access technology (RAT). That is, the processing circuit 502 (e.g., the RAT change circuit/module 514) executing the RAT change operations 522 can cause the second subscription associated with SIM-B 510 to initiate a service search on a different radio access technology (RAT), to reselect to a neighbor cell on the different radio access technology (RAT), or both, at operation 904. In some examples, a NAS layer associated with the second subscription (e.g., SIM-B 510) can initiate the service search and/or the cell reselection to a neighboring cell in response to the indication of data transfer on the first subscription by instructing the second subscription to change to the different radio access technology (RAT).

By implementing one or more aspects of the present disclosure, access terminals employing multiple subscriptions can ensure that mobile-terminated call performance and throughput are not degraded, which would otherwise occur due to the idle subscription detecting a loss of service in its active radio access technology (RAT) and repeatedly attempting and failing to re-acquire service on that same radio access technology (RAT).

While the above discussed aspects, arrangements, and embodiments are discussed with specific details and particularity, one or more of the components, steps, features and/or functions illustrated in FIGS. 1, 2, 3, 4, 5, 6, 7, 8, and/or 9 may be rearranged and/or combined into a single component, step, feature or function or embodied in several components, steps, or functions. Additional elements, components, steps, and/or functions may also be added or not utilized without departing from the present disclosure. The apparatus, devices and/or components illustrated in FIGS. 1, 2, and/or 5 may be configured to perform or employ one or more of the methods, features, parameters, and/or steps described in FIGS. 3, 4, 6, 7, 8, and/or 9. The novel algorithms described herein may also be efficiently implemented in software and/or embedded in hardware.

While features of the present disclosure may have been discussed relative to certain embodiments and figures, all embodiments of the present disclosure can include one or more of the advantageous features discussed herein. In other words, while one or more embodiments may have been discussed as having certain advantageous features, one or more of such features may also be used in accordance with any of the various embodiments discussed herein. In similar fashion, while exemplary embodiments may have been discussed herein as device, system, or method embodiments, it should be understood that such exemplary embodiments can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

What is claimed is:

1. An access terminal, comprising:
a communications interface;
a plurality of subscription modules, including a first subscription module associated with a first subscription, and a second subscription module associated with a second subscription; and
a processing circuit coupled to the communications interface and the plurality of subscription modules, the processing circuit adapted to:
establish, via the communications interface, a data communication session on the first subscription utilizing a first network associated with a first radio access technology;
establish, via the communications interface, an idle mode connection on the second subscription utilizing a second network associated with a second radio access technology different from the first radio access technology;
determine that the data communication session on the first subscription is indicating active data transfer; and
cause the second subscription to attempt to change the idle mode connection on the second radio access technology to the first radio access technology in response to the determination that the data communication session on the first subscription is indicating active data transfer.

2. The access terminal of claim 1, wherein the first network comprises a Global System for Mobile Communications (GSM) network.

3. The access terminal of claim 2, wherein the processing circuit adapted to determine that the data communication session on the first subscription is indicating active data transfer comprises the processing circuit adapted to:
determine that the first subscription is in a GPRS Mobility Management (GMM) ready state.

4. The access terminal of claim 2, wherein the second network comprises a Wideband Code Division Multiple Access (W-CDMA) network or a Long Term Evolution (LTE) network.

5. The access terminal of claim 1, wherein the processing circuit adapted to cause the second subscription to attempt to change the idle mode connection on the second radio access technology to the first radio access technology comprises the processing circuit adapted to:
cause the second subscription to initiate a service search on the first radio access technology.

6. The access terminal of claim 1, wherein the processing circuit adapted to cause the second subscription to attempt to change the idle mode connection on the second radio access technology to the first radio access technology comprises the processing circuit adapted to:
cause the second subscription to reselect to a neighbor cell on the first radio access technology.

7. The access terminal of claim 1, wherein the processing circuit adapted to cause the second subscription to attempt to change the idle mode connection on the second radio access technology to the first radio access technology comprises:
a Non-Access Stratum (NAS) layer adapted to instruct the second subscription to change to the first radio access technology.

8. A method operational on an access terminal, comprising:
establishing a data communication session on a first subscription utilizing a first network associated with a first radio access technology;
establishing an idle mode connection on a second subscription utilizing a second network associated with a second radio access technology different from the first radio access technology;
determining that the data communication session on the first subscription indicates active data transfer; and
attempting to change the idle mode connection on the second subscription from the second radio access technology to the first radio access technology in response to the determination that the data communication session on the first subscription is indicating active data transfer.

9. The method of claim 8, wherein establishing the data communication session on the first subscription utilizing the first network comprises:
establishing the data communication session on the first subscription utilizing a Global System for Mobile Communications (GSM) network.

10. The method of claim 9, wherein determining that the data communication session on the first subscription indicates active data transfer comprises:
determining that a GPRS Mobility Management (GMM) layer associated with the first subscription is in a ready state.

11. The method of claim 9, wherein establishing the idle mode connection on the second subscription utilizing the second network comprises:
establishing the idle mode connection on the second subscription utilizing a Wideband Code Division Multiple Access (W-CDMA) network or a Long Term Evolution (LTE) network.

12. The method of claim 8, wherein attempting to change the idle mode connection on the second subscription from the second radio access technology to the first radio access technology comprises:
initiating a service search by the second subscription on the different first radio access technology.

13. The method of claim 8, wherein attempting to change the idle mode connection on the second subscription from the second radio access technology to the first radio access technology comprises:
initiating a cell reselection by the second subscription to a neighbor cell on the first radio access technology.

14. An access terminal, comprising:
means for establishing a data communication session on a first subscription utilizing a first network associated with a first radio access technology;
means for establishing an idle mode connection on a second subscription utilizing a second network associated with a second radio access technology different from the first radio access technology;
means for determining that the data communication session on the first subscription indicates active data transfer; and
means for attempting to change the idle mode connection on the second subscription from the second radio access technology to the first radio access technology in response to the determination that the data communication session on the first subscription is indicating active data transfer.

15. The access terminal of claim 14, wherein the first network comprises a Global System for Mobile Communications (GSM) network.

16. The access terminal of claim 15, wherein the means for determining that the data communication session on the first subscription indicates active data transfer comprises:
    means for determining that the first subscription is in a GPRS Mobility Management (GMM) ready state.

17. The access terminal of claim 14, wherein the means for attempting to change the idle mode connection on from the second radio access technology to the first radio access technology comprises at least one of:
    means for performing a service search by the second subscription on the first radio access technology; and
    means for performing a cell reselection by the second subscription to a neighbor cell on the first radio access technology.

18. A processor-readable storage medium, comprising programming for causing a processing circuit to:
    establish a data communication session on a first subscription utilizing a first network associated with a first radio access technology;
    establish an idle mode connection on a second subscription utilizing a second network associated with a second radio access technology different from the first radio access technology;
    determine that the data communication session on the first subscription indicates active data transfer; and
    attempt to change the idle mode connection on the second subscription from the second radio access technology to the first radio access technology in response to the determination that the data communication session on the first subscription is indicating active data transfer.

19. The processor-readable storage medium of claim 18, wherein the first network comprises a Global System for Mobile Communications (GSM) network.

20. The processor-readable storage medium of claim 19, wherein the programming for causing a processing circuit to determine that the data communication session on the first subscription indicates active data transfer comprises programming for causing a processing circuit to:
    determine that a GPRS Mobility Management (GMM) layer associated with the first subscription is in a ready state.

21. The processor-readable storage medium of claim 18, wherein the programming for causing a processing circuit to attempt to change the idle mode connection on the second subscription from the second radio access technology to the first radio access technology comprises programming for causing a processing circuit to:
    initiate a service search by the second subscription on the first radio access technology.

22. The processor-readable storage medium of claim 18, wherein the programming for causing a processing circuit to attempt to change the idle mode connection on the second subscription from the second radio access technology to the first radio access technology comprises programming for causing a processing circuit to:
    initiate a cell reselection by the second subscription to a neighbor cell on the first radio access technology.

23. The processor-readable storage medium of claim 18, wherein the programming for causing a processing circuit to attempt to change the idle mode connection on the second subscription from the second radio access technology to the first radio access technology comprises:
    programming for causing a Non-Access Stratum (NAS) layer to instruct the second subscription to change to the different radio access technology.

* * * * *